(12) United States Patent
Nagatomi et al.

(10) Patent No.: US 10,773,592 B2
(45) Date of Patent: Sep. 15, 2020

(54) SOUND OUTPUT AND TEXT DISPLAY DEVICE FOR A VEHICLE

(71) Applicant: Toyota Jidosha Kabushiki Kaisha, Toyota-shi, Aichi-ken (JP)

(72) Inventors: Keiko Nagatomi, Toyota (JP); Noritaka Toyama, Anjo (JP); Atsuko Kobayashi, Nagoya (JP); Keisuke Ito, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/272,213

(22) Filed: Feb. 11, 2019

(65) Prior Publication Data
US 2019/0248238 A1    Aug. 15, 2019

(30) Foreign Application Priority Data

Feb. 15, 2018    (JP) .................................. 2018-024842

(51) Int. Cl.
*B60K 35/00*    (2006.01)
*G02B 27/01*    (2006.01)

(52) U.S. Cl.
CPC .............. *B60K 35/00* (2013.01); *G02B 27/01* (2013.01); *B60K 2370/148* (2019.05); *B60K 2370/157* (2019.05); *B60K 2370/1523* (2019.05); *B60K 2370/1529* (2019.05); *B60K 2370/163* (2019.05); *B60K 2370/164* (2019.05); *B60K 2370/175* (2019.05); *B60K 2370/182* (2019.05); *B60K 2370/184* (2019.05); *B60K 2370/1868* (2019.05); *B60K 2370/195* (2019.05); *B60K 2370/20* (2019.05); *B60K 2370/21* (2019.05); *B60K 2370/334* (2019.05); *B60K 2370/52* (2019.05); *B60K 2370/569* (2019.05); *B60K 2370/592* (2019.05); *B60K 2370/595* (2019.05); *B60K 2370/741* (2019.05)

(58) Field of Classification Search
None
See application file for complete search history.

(56) References Cited

U.S. PATENT DOCUMENTS 8,907,773 B2    12/2014  Choi
2019/0031027 A1*  1/2019  Pala .................. B60K 35/00

FOREIGN PATENT DOCUMENTS

| CN | 105989865 A | 10/2016 |
|---|---|---|
| JP | H0524462 A | 2/1993 |
| WO | 2013090125 A1 | 6/2013 |

OTHER PUBLICATIONS

Extended European Search Report dated Mar. 7, 2019 in corresponding European Patent Application 19151025.4.

* cited by examiner

*Primary Examiner* — Nicholas J Lee
(74) *Attorney, Agent, or Firm* — Dinsmore & Shohl LLP

(57) ABSTRACT

A sound output and text display device for a vehicle, including: an output unit that, in a case in which sound to be output inside the vehicle has been decided, outputs the sound inside the vehicle; and a display unit that displays text corresponding to the sound on a windshield in accordance with a state of use of the vehicle.

6 Claims, 7 Drawing Sheets

SOUND OUTPUT AND TEXT DISPLAY DEVICE FOR A VEHICLE

CROSS-REFERENCE TO RELATED APPLICATION

This application is based on and claims priority under 35 USC 119 from Japanese Patent Application No. 2018-024842, filed on Feb. 15, 2018, the disclosure of which is incorporated by reference herein.

BACKGROUND

Technical Field

The present disclosure relates to a sound output and text display device for a vehicle.

Related Art

Technology in which vehicle information such as a vehicle speed and the like is projected onto a windshield is disclosed in Japanese Patent Application Laid-Open (JP-A) No. H5-24462.

It is conceivable that a vehicle occupant may wish to play music, and to sing along to the music inside a vehicle, while the vehicle is traveling. In such cases, if the vehicle occupant only vaguely remembers the lyrics, they find it difficult to sing the song, and it would be pleasantly convenient if the lyrics were displayed on the windshield. Moreover, it is also conceivable that a vehicle occupant might wish to perform listening exercises in order to learn a foreign language or the like, inside a vehicle while that vehicle is being driven. When performing such listening exercises, if subtitles for the foreign language being studied were displayed on the windshield, this would enable the learning of the foreign language to be performed more efficiently.

However, in the aforementioned conventional example, because it is possible to display only vehicle information that has been determined in advance, it is not possible to display lyrics or foreign language subtitles on the windshield inside a vehicle while vehicle is being driven.

SUMMARY

The present disclosure provides a sound output and text display device for a vehicle that may display text associated with sound played inside a vehicle on a windshield, and may enable the text to be easily verified without compromising driving safety.

A first aspect of the present disclosure is a sound output and text display device for a vehicle, including: an output unit that, in a case in which sound to be output inside the vehicle has been decided, outputs the sound inside the vehicle; and a display unit that displays text corresponding to the sound on a windshield in accordance with a state of use of the vehicle.

In this sound output and text display device for a vehicle, once sound to be output has been decided, the sound is output inside the vehicle by an output unit. In addition, text that corresponds to the sound is displayed by a display unit on a windshield, in accordance with the state of use of the vehicle. The state of use of the vehicle refers to whether the vehicle is currently in a manually driven state, or is in some other state. In other words, text corresponding to the sound is displayed on the windshield in an appropriate manner in accordance with the state of use of the vehicle. As a result, the first aspect of the present disclosure may enable a vehicle occupant to check the lyrics of songs being played inside the vehicle, or to check subtitles while listening to foreign language teaching materials.

In a second aspect of the present disclosure, in the first aspect, positions where the text is displayed by the display unit in a case in which the vehicle is in a manually driven state may be restricted to predetermined positions.

In the second aspect, the positions where text is displayed by the display unit when the vehicle is in a manually driven state are restricted to predetermined positions. These predetermined positions are positions where the vision of the driver is not obstructed, and where the action of driving is not impeded. Accordingly, in the second aspect, text displayed on the windshield may be safely checked even when the vehicle is being manually driven.

In a third aspect of the present disclosure, in the first aspect or second aspect, a position at a driver's seat side, a position at a front passenger's seat side, or positions at both the driver's seat side and the front passenger's seat side may be selected as the position where the text is displayed by the display unit.

In the third aspect of the present disclosure, the position where text is displayed by the display unit may be set to exclusively the driver's seat side, exclusively the front passenger's seat side, or to both the driver's seat side and the front passenger's seat side. The selection of this position may be performed either automatically or manually.

In a fourth aspect of the present disclosure, in the third aspect, the position where the text is displayed may be selected based on characteristics of the sound.

In the fourth aspect of the present disclosure, the position where the text is displayed is selected based on characteristics of the sound. These characteristics of the sound include, for example, in the case of karaoke, characteristics of a song intended to be sung by one person, and characteristics of a song intended to be sung as a duet. Text for a song to be sung by one person is simply the lyrics of that song. Text for a song to be sung as a duet is separated into the lyrics for a first part and the lyrics for a second part. Accordingly, if the sound is a song to be sung by one person, then the position where the text is displayed can be selected to match the seating position of the vehicle occupant who is singing. Alternatively, if the sound is a song to be sung as a duet, then the lyrics for the first part can be displayed on one of the driver's seat side or the front passenger's seat side, while the lyrics for the second part are displayed on the other one of the driver's seat side or the front passenger's seat side.

In a fifth aspect of the present disclosure, in the above-described aspects, the sound may be at least one of instrumental sound or vocal sound, and the text may be lyrics of the sound.

Here, the term 'vocal sound' refers to a human singing voice, however, this term is not limited to this exclusively, and may also include, for example, singing voices artificially created by a computer and the like. In the fifth aspect of the present disclosure, once a sound to be output has been decided and has been output inside a vehicle, lyrics that correspond to that sound are displayed on the windshield by a display unit. Accordingly, a vehicle occupant may listen to a sound or sing along to a sound, while checking the lyrics displayed on the windshield.

According to the sound output and text display device for a vehicle of the first aspect of the present disclosure, text that is associated with a sound being played inside a vehicle may be displayed on a windshield, and this text may be verified easily without compromising driving safety.

According to the sound output and text display device for a vehicle of the second aspect of the present disclosure, driving manually may be supported such that driving manually may be made even safer.

According to the sound output and text display device for a vehicle of the third aspect of the present disclosure, the required text may be displayed at the required side, and a vehicle occupant may arbitrarily select the position where the text is to be displayed.

According to the sound output and text display device for a vehicle of the fourth aspect of the present disclosure, text may be displayed at an appropriate position based on the characteristics of the sound.

According to the sound output and text display device for a vehicle of the fifth aspect of the present disclosure, a vehicle occupant may enjoy karaoke inside a vehicle.

BRIEF DESCRIPTION OF THE DRAWINGS

Exemplary embodiments of the present disclosure will be described in detail based on the following figures, wherein.

DETAILED DESCRIPTION

Hereinafter, an exemplary embodiment for implementing the present disclosure will be described in detail with reference to the drawings. Note that an arrow RH and an arrow UP that are shown in the appropriate drawings respectively indicate a vehicle right side and a vehicle upper side.

Figure 1:
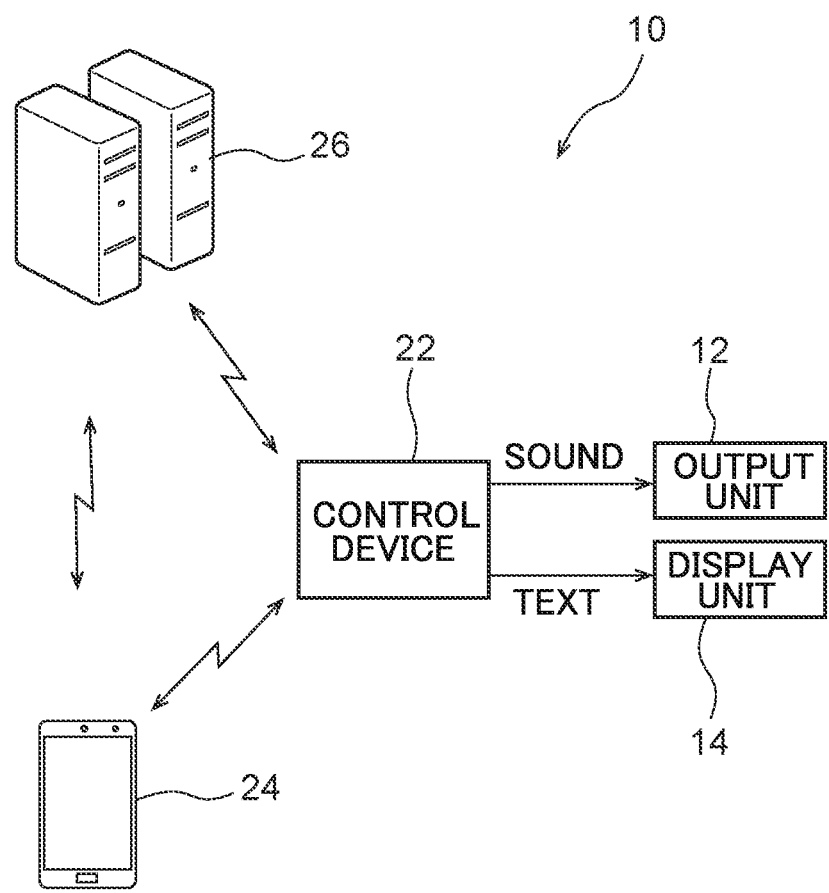
FIG. 1 is a block diagram showing a sound output and text display device for a vehicle according to a present exemplary embodiment.

In FIG. 1, a sound output and text display device for a vehicle 10 according to the present exemplary embodiment has an output unit 12 and a display unit 14.

Figure 4:
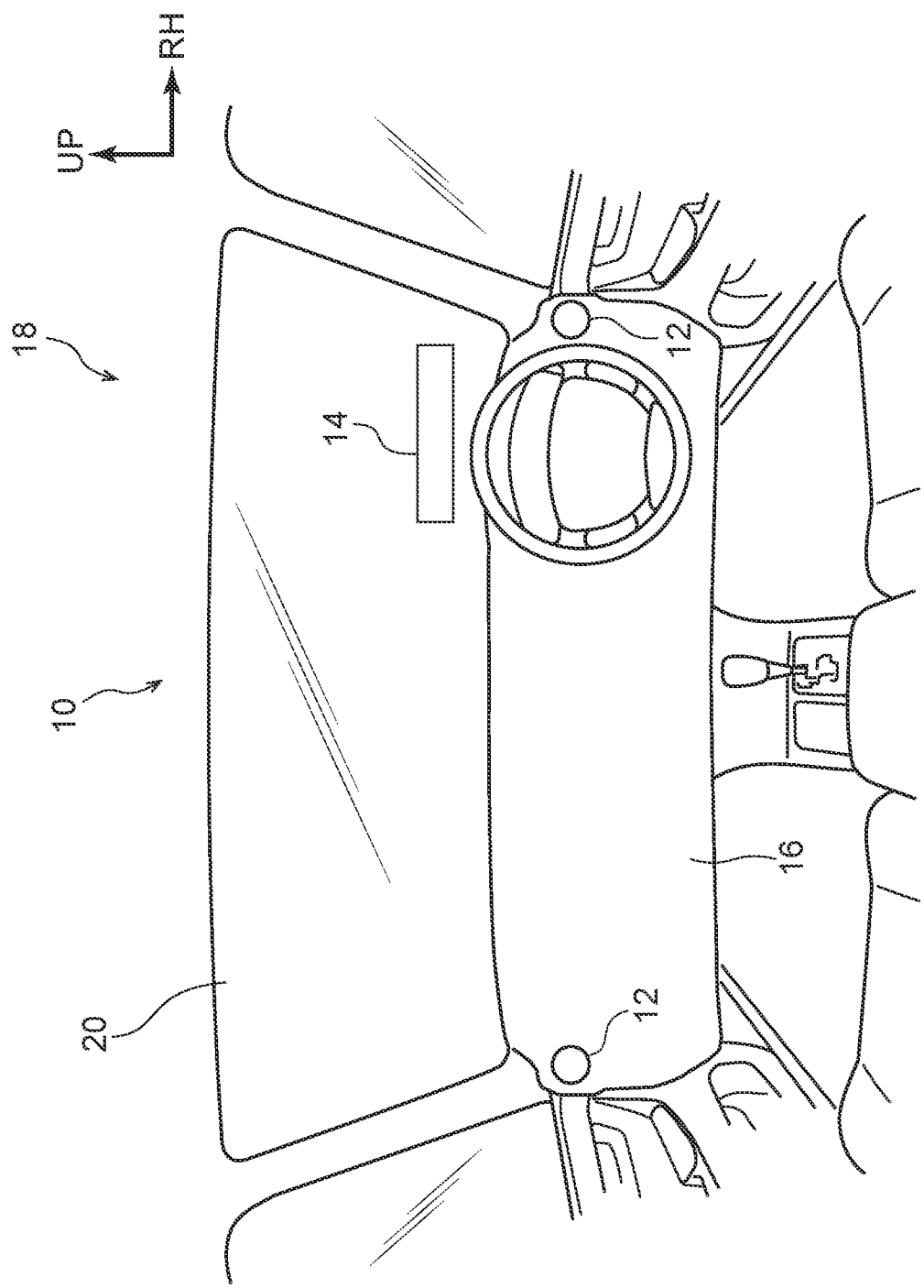
FIG. 4 is a front view showing an example of text being displayed on a driver's seat side of a windshield.
Figure 5:
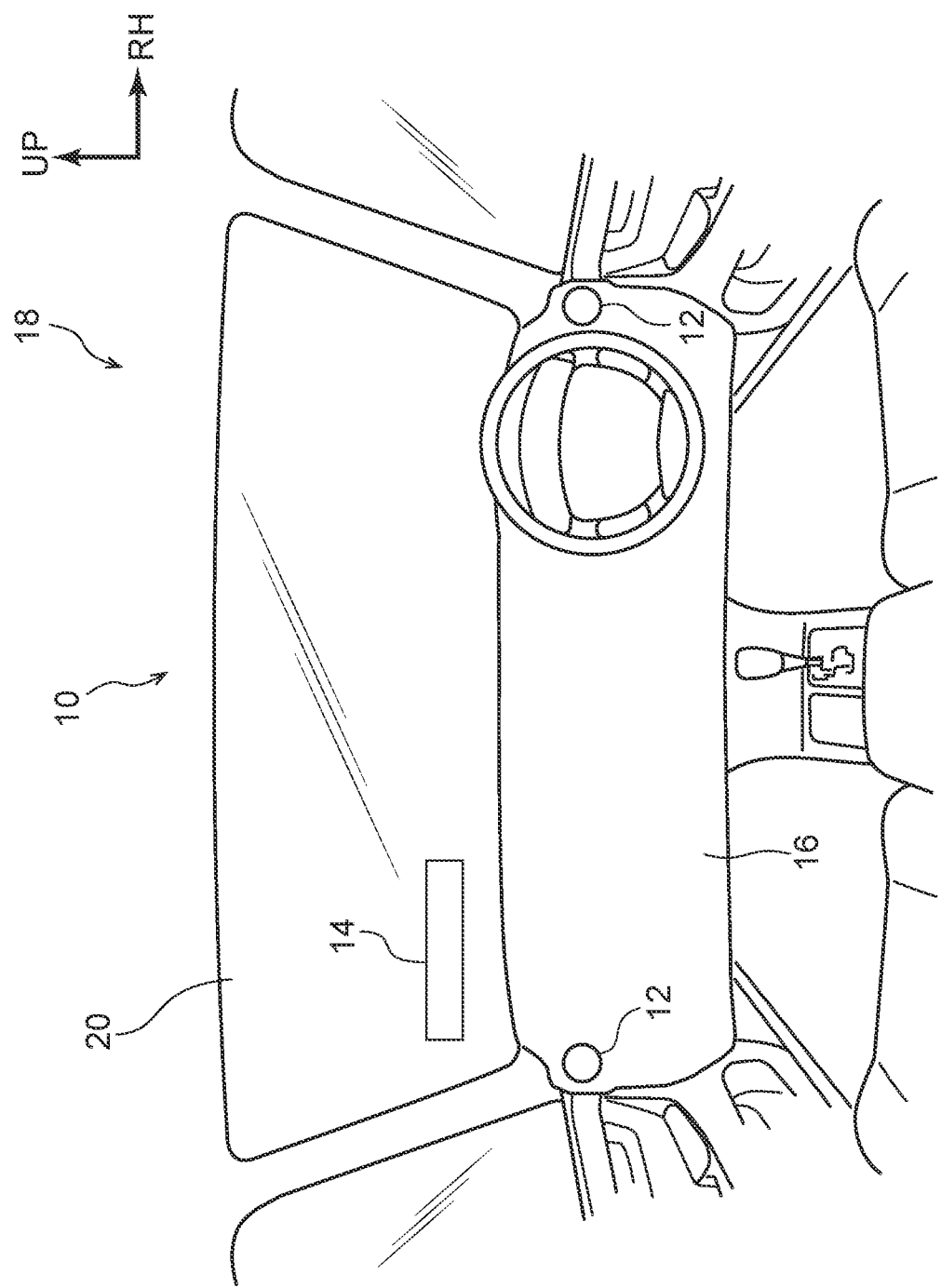
FIG. 5 is a front view showing an example of text being displayed on a passenger's seat side of a windshield.
Figure 6:
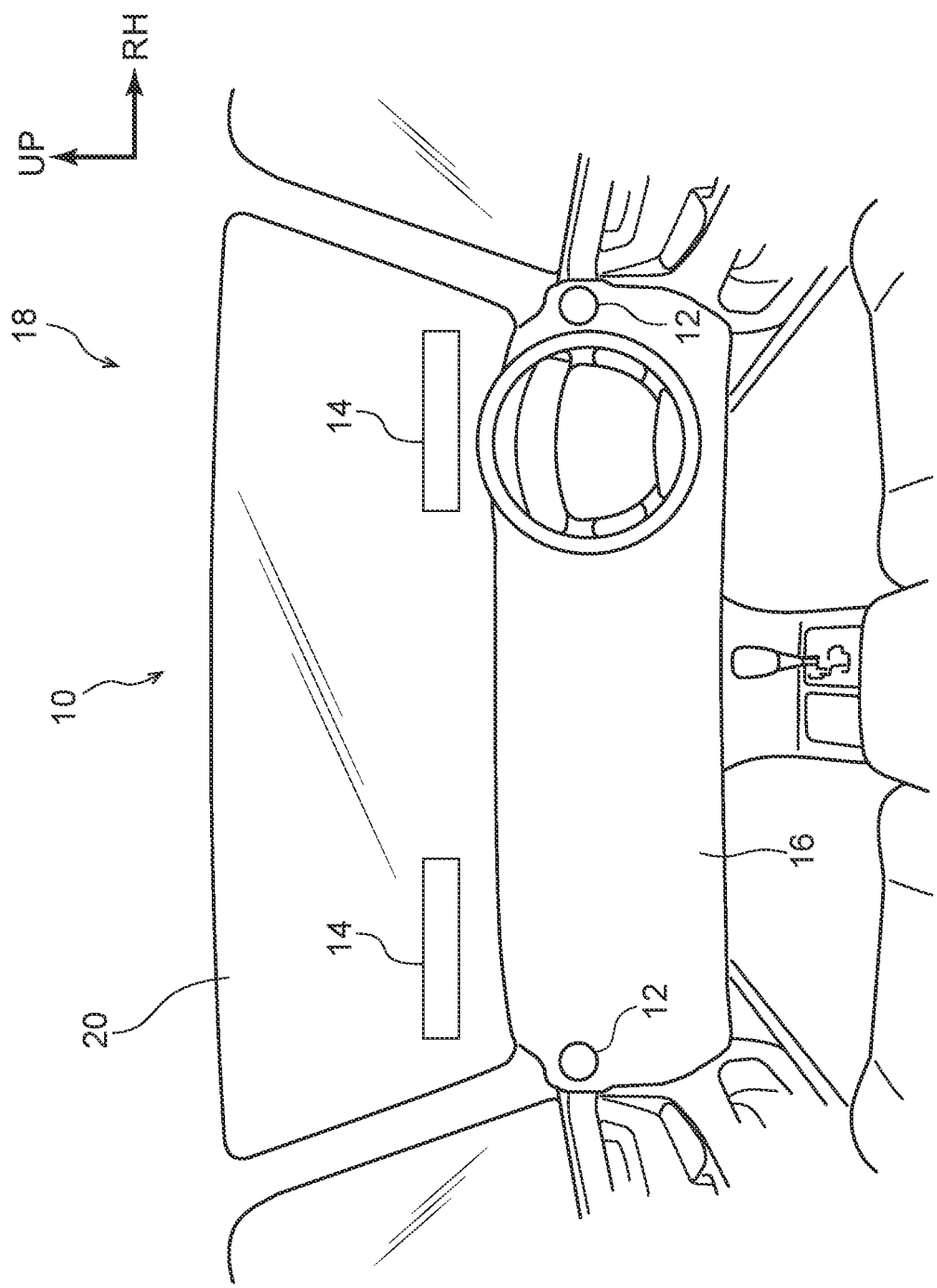
FIG. 6 is a front view showing an example of text being displayed on a driver's seat side and a passenger's seat side of a windshield.

In FIG. 1, the output unit 12 is, for example, a speaker that, once a sound to be output inside a vehicle has been decided, outputs the sound inside the vehicle. As is shown in FIG. 4 through FIG. 6, the output unit 12 is provided, for example, in an instrument panel 16. The sound may be, for example, at least one of instrumental sound or vocal sound, or a spoken accompaniment of foreign language teaching materials.

The display unit 14 is a device that displays text which corresponds to the sound on a windshield 20 in accordance with the state of use of a vehicle 18. When the sound is a vocal sound (e.g., a song), or an instrumental sound intended for lyrics (e.g., karaoke music), or a combination of both vocal sound and instrumental sound (e.g., both music and lyrics together), then the text is formed by the lyrics of each of these. Here, the term 'vocal sound' refers to a human singing voice, however, this term is not limited exclusively to this definition, and may also include, for example, singing voices artificially created by a computer and the like. Additionally, if the sound is a spoken voice used in foreign language teaching materials, then the term 'text' refers to subtitles for words spoken by that voice.

The specific structure of the display unit 14 is not described here, however, any suitable structure may be employed provided that it is capable of displaying text on the windshield 20. The display unit 14 may be formed by superimposing a transparent liquid crystal display onto the vehicle interior side of the windshield 20. If the display unit 14 is formed by a transparent liquid crystal display, then text can easily be displayed at a desired position. Additionally, it is also possible for a projector that projects text onto the windshield 20 to be used as the display unit 14. The number of projectors provided is not limited to one, and it is also possible for plural projectors to be provided. Furthermore, it is also possible to use both a transparent liquid crystal display and a projector in combination as the display unit.

In the present exemplary embodiment, the output unit 12 and the display unit 14 are controlled by a control device 22. The control device 22 is able to send a selected sound to the output unit 12. In addition, the control device 22 is also able to send text that corresponds to that sound to the display unit 14. Note that the control device 22 may form part of a car navigation device or a car audio device, or may be a separate structure from a car navigation device or a car audio device.

In FIG. 1, the selection of the sound can be made using a terminal such as a smartphone 24 or the like, or an operating unit such as the control device 22 or the like. The smartphone 24 can be connected either wirelessly or via a cable to the control device 22.

A storage location for data for the sound and text can be an optional location such as the control device 22, the smartphone 24, or an external server 26 or the like. Data that is stored in the external server 26 may be transmitted directly to the control device 22, or may be transmitted to the control device 22 via the smartphone 24.

It is not necessary for the sound data and the text data to be stored in the same location, and the sound data and the text data may be stored in mutually different locations. More specifically, for example, once a sound stored in the smartphone 24 has been selected, software in the smartphone 24 or in the control device 22 analyzes that sound, and data for text that corresponds to that sound may be downloaded automatically from another location such as the external server 26.

The position where the text is displayed is selected by the control device 22 in accordance with the state of use of the vehicle 18. Here, the term 'state of use of the vehicle 18' refers to whether the vehicle 18 is currently being manually driven, or is in some other state. In other words, the position where the text is displayed is selected depending on whether or not the state of use of the vehicle is a state in which the vehicle is currently being manually driven.

A state in which the vehicle is not currently being manually driven (i.e., a non-manually driven state) is a state in which the vehicle 18 is stopped and has not started to move, or an automated driving state in which it is not necessary to manually drive the vehicle. The following two instances may be considered as examples in which 'the vehicle 18 is stopped and is not about to move'. A first example is a case in which, if the vehicle 18 has automatic transmission, then the shift lever is in the P position, and the parking brake is in operation. A second example is a case in which, if the vehicle has manual transmission, then the shift lever is in neutral, and the parking brake is in operation.

Figure 2:
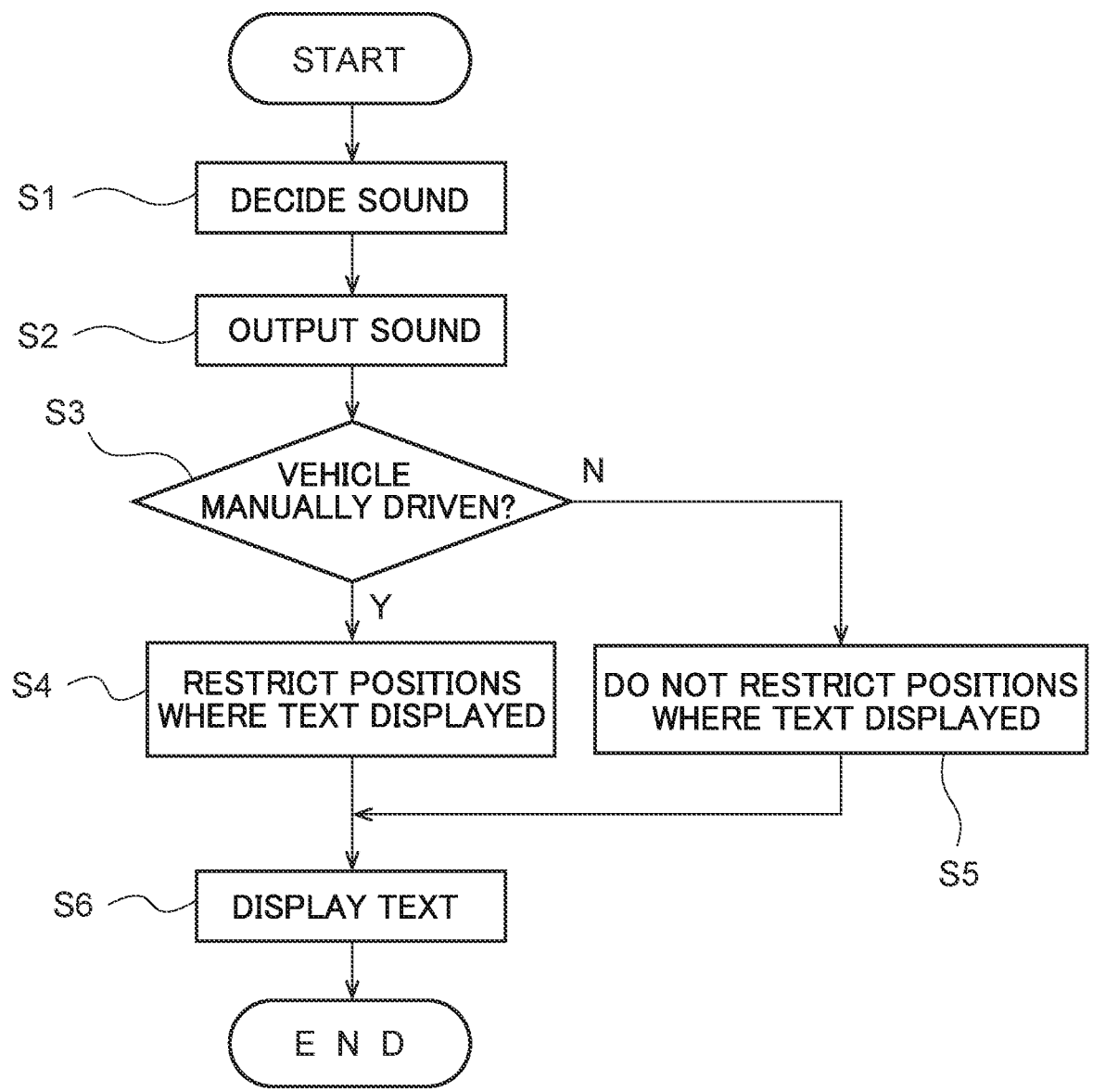
FIG. 2 is a flowchart showing a processing flow from when a sound to be output is decided on until text is displayed.

A flow of control processing from the selection of a sound to the display of text is shown in a flowchart in FIG. 2. In step S1, a sound to be output inside a vehicle is decided. In step S2, the selected sound is output. In step S3, whether or not the state of use of the vehicle 18 is a manually driven state is determined. If the state of use of the vehicle 18 is a manually driven state, then in step S4, the position where text is displayed is restricted to predetermined positions (FIG. 4 through FIG. 6). These predetermined positions are positions where the vision of the driver is not obstructed, and where the action of driving is not impeded such as, for example, in a lower portion of the windshield 20. If the state of use of the vehicle 18 is not a manually driven state, then in step S5, there are no restrictions on the position where text can be displayed. If there are no restrictions, then the position where the text is displayed can be set, for example, to the entire central portion of the windshield 20 (see FIG. 7). Next, in step S6, text is actually displayed on the windshield 20.

Figure 3:
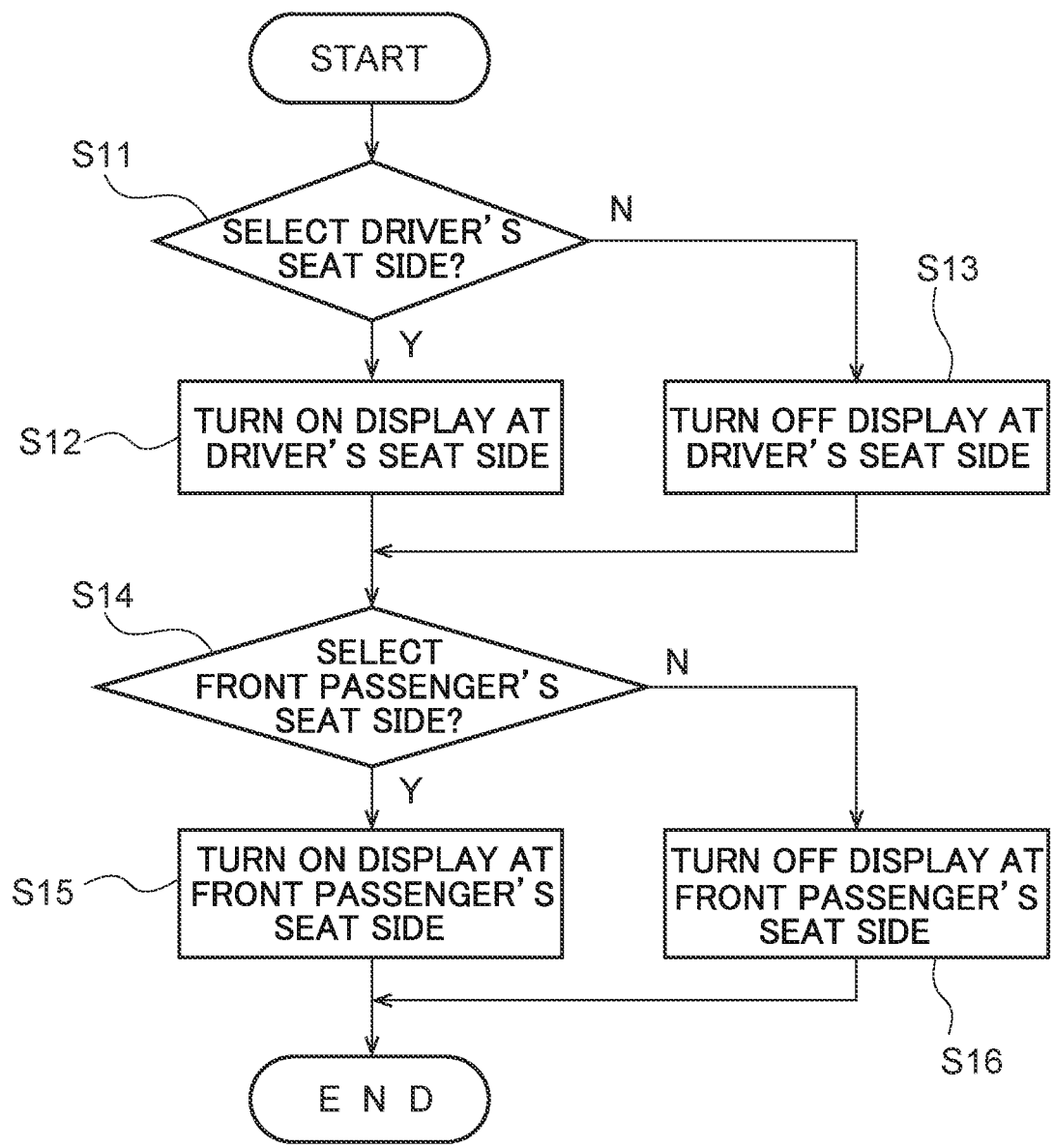
FIG. 3 is a flowchart showing in detail a step S4 from FIG. 2.

If there are restrictions on the position where text can be displayed (step S4), then as is shown in a flowchart in FIG. 3, either the driver's seat side, or the front passenger's seat side, or both the driver's seat side and the front passenger's seat side can be selected as the position (or positions) where text is displayed by the display unit 14. In step S11, whether or not to select the driver's seat side is determined. If the driver's seat side is selected, then in step S12, a driver's seat side display is set to ON. If the driver's seat side is not selected, then in step S13, the driver's seat side display is set to OFF. Next, in step S14, whether or not to select the front passenger's seat side is determined. If the front passenger's seat side is selected, then in step S15, a front passenger's seat side display is set to ON. If the front passenger's seat side is not selected, then in step S16, the front passenger's seat side display is set to OFF.

The selection of the position for displaying text may be made via an operation performed by a vehicle occupant, and may be made in accordance with the characteristics of the sound. The term 'characteristics of the sound' refers, for example, to the characteristics in karaoke of a song to be sung by one person, or the characteristics (e.g., duet information) of a song to be sung as a duet. The text displayed for a song to be sung by one person is formed by the lyrics of that song. The text displayed for a song to be sung as a duet is formed by the lyrics for a first part (e.g., a male part) and the lyrics for a second part (e.g., a female part).

If the sound to be output inside the vehicle is a karaoke song for one person, and there is only one vehicle occupant, then a mode of use in which the display position for the lyrics is set to the side where that vehicle occupant is sitting might be expected. If a song for one person is selected, and there are vehicle occupants on both the driver's seat side and the front passenger's seat side, then the display position for the lyrics can be selected as is desired. Moreover, if the sound to be output inside the vehicle is a duet song, then the genders of the vehicle occupant on the front passenger's side and the vehicle occupant on the driver's seat side are determined respectively using a camera or the like, and a mode of use in which the display position for the lyrics for the first part is set to the side where the male is sitting, and the display position for the lyrics for the second part is set to the side where the female is sitting might be expected. Note that it is also possible for the display position for the lyrics for the first part (e.g., the male part) and the display position for the lyrics for the second part (e.g., the female part) to be selected via an operation performed by a vehicle occupant.

The present exemplary embodiment has the above-described structure, and operations thereof will now be described. In FIG. 1 and FIG. 4 through FIG. 7, in the sound output and text display device for a vehicle 10 according to the present exemplary embodiment, when a sound to be output is decided in the control device 22, the sound is output by the output unit 12 inside the vehicle. Additionally, text that corresponds to that sound is displayed by the display unit 14 on the windshield 20 in accordance with the state of use of the vehicle 18. In other words, text that corresponds to the sound is appropriately displayed on the windshield 20 in accordance with the state of use of this vehicle 18. As a result, for example, a vehicle occupant may check the lyrics of music being played inside the vehicle, or may check subtitles while listening to a spoken accompaniment of foreign language teaching materials. Because of this, it is possible to display text which is associated with the sound being played inside a vehicle on the windshield 20, and to verify that text easily without compromising driving safety.

In the present exemplary embodiment, when a vehicle is in a manually driven state, the positions where text is displayed by the display unit 14 are restricted to predetermined positions, for example, to a lower portion of the windshield 20. At this time, the position where text is displayed by the display unit 14 can be set to only at the driver's seat side (see FIG. 4), only at the front passenger's seat side (see FIG. 5), or to both the driver's seat side and the front passenger's seat side (FIG. 6). This position selection can be made either automatically or manually. Accordingly, text displayed on the windshield 20 may be checked safely even when the vehicle is being manually driven. Because of this, manual driving may be supported such that driving may be made even safer.

Figure 7:
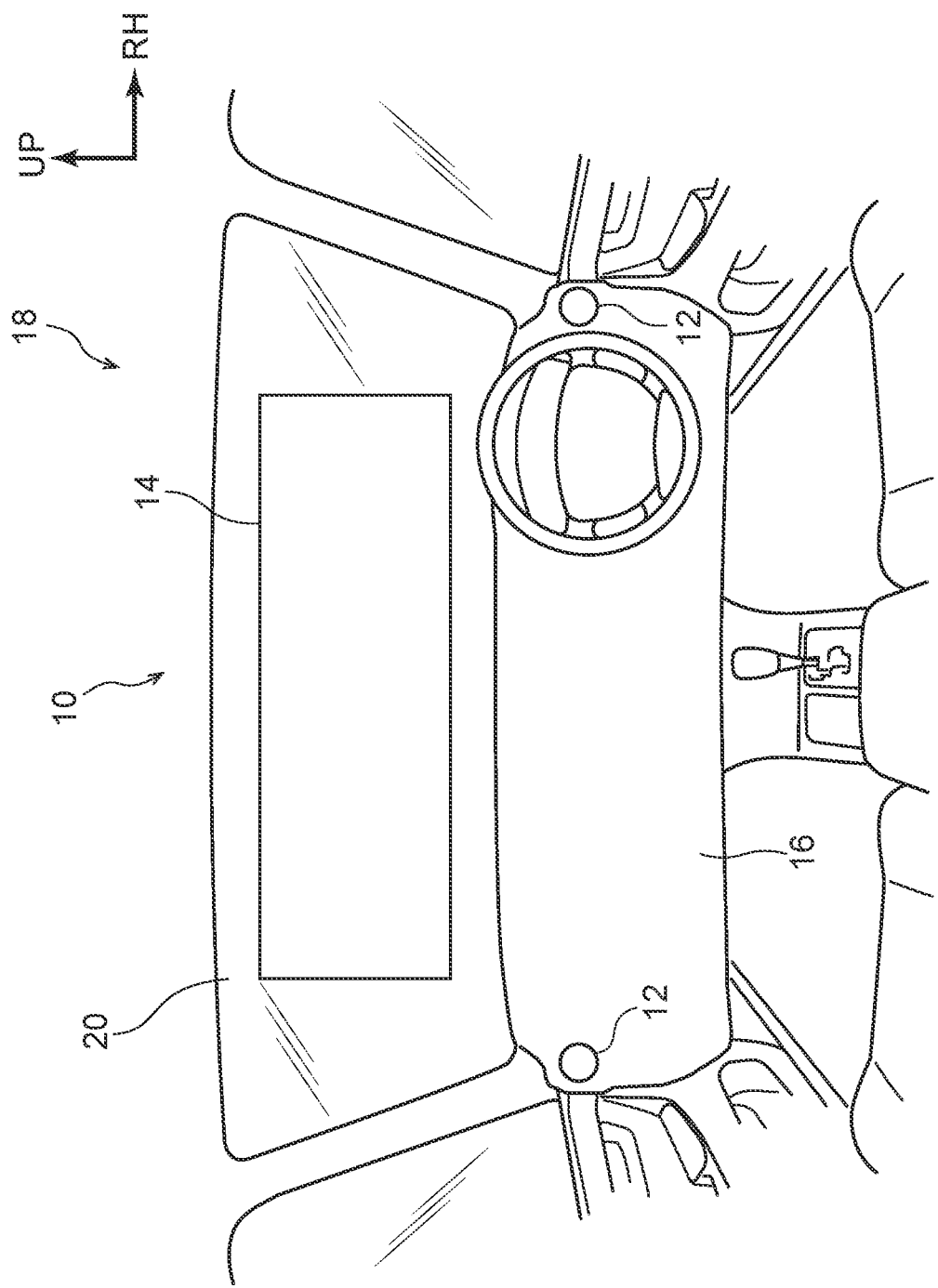
FIG. 7 is a front view showing an example of text being displayed on an entire central portion of a windshield.

When the vehicle state of use is a stopped state or an automated driving state in which the vehicle is not currently being manually driven, then, as is shown in FIG. 7, it is also possible for the position where text is displayed to be set as the entire central portion of the windshield.

Additionally, it is also possible for the position where the text is displayed to be selected based on characteristics of the sound. Accordingly, if the sound is a song to be sung by one person, then the position where the text is displayed can be selected to match the seating position of the vehicle occupant who is singing. Alternatively, if the sound is a song to be sung as a duet, then the lyrics for the first part can be displayed on one of the driver's seat side or the front passenger's seat side, while the lyrics for the second part are displayed on the other one of the driver's seat side or the front passenger's seat side. In other words, the necessary text may be displayed at the necessary side, or else the position where the text is displayed may be selected as is desired by a vehicle occupant. Additionally, text may also be displayed in an appropriate position based on the characteristics of the sound.

When the sound is a vocal sound (e.g., a song), or an instrumental sound intended for lyrics (e.g., karaoke music), or a combination of both vocal sound and instrumental sound (e.g., both music and lyrics together), then once the sound to be output has been decided and is output inside the vehicle, lyrics corresponding to the sound are displayed by the display unit 14 on the windshield 20. Accordingly, a vehicle occupant is able to check the lyrics that are displayed on the windshield 20 and, at the same time, listen to the music or sing along to the music. Because of this, a vehicle occupant may enjoy karaoke inside a vehicle.

An example of an exemplary embodiment of the present disclosure has been described above, however, exemplary embodiments of the present disclosure are not limited to this, and it is to be understood that various modifications and the like may be made to the present disclosure insofar as they do not depart from the spirit or scope of the present disclosure.

What is claimed is:

1. A sound output and text display device for a vehicle, comprising:
    an output unit that, in a case in which sound to be output inside the vehicle has been decided, outputs the sound inside the vehicle;
    a control device configured to: (i) determine whether the vehicle is currently being manually driven; and (ii) select a position on a windshield to display text corresponding to the sound based on the determination of whether the vehicle is currently being manually driven; and
    a display unit that displays the text corresponding to the sound on the selected position on the windshield, wherein the position where the text is displayed is selected based on characteristics of a karaoke song to be sung.

2. The sound output and text display device for the vehicle according to claim 1, wherein positions where the text is displayed by the display unit in a case in which the vehicle is in a manually driven state are restricted to predetermined positions.

3. The sound output and text display device for the vehicle according to claim 1, wherein a position at a driver's seat side, a position at a front passenger's seat side, or positions at both the driver's seat side and the front passenger's seat side can be selected as the position where the text is displayed by the display unit.

4. The sound output and text display device for the vehicle according to claim 1, wherein the sound is at least one of instrumental sound or vocal sound, and the text is lyrics of the sound.

5. The sound output and text display device for the vehicle according to claim 1, wherein, in a case in which the vehicle is in a manually driven state, the display unit displays the text at a lower portion of the windshield.

6. The sound output and text display device for the vehicle according to claim 1, wherein, in a case in which the vehicle is not currently being manually driven, the display unit displays the text at an entire central portion of the windshield.

* * * * *

UNITED STATES PATENT AND TRADEMARK OFFICE
CERTIFICATE OF CORRECTION

PATENT NO. : 10,773,592 B2
APPLICATION NO. : 16/272213
DATED : September 15, 2020
INVENTOR(S) : Keiko Nagatomi et al.

Page 1 of 1

It is certified that error appears in the above-identified patent and that said Letters Patent is hereby corrected as shown below:

On the Title Page

Item (72), inventor 1, city, delete "Toyota" and insert --Toyota-shi Aichi-ken--, therefor.

Item (72), inventor 2, city, delete "Anjo" insert --Anjo-shi Aichi-ken--, therefor.

Item (72), inventor 3, city, delete "Nagoya" insert --Nagoya-shi Aichi-ken--, therefor.

Item (72), inventor 4, city, delete "Okazaki" insert --Okazaki-shi Aichi-ken--, therefor.

Signed and Sealed this
Fifth Day of January, 2021

Andrei Iancu
*Director of the United States Patent and Trademark Office*